Patented Jan. 31, 1950

2,496,064

UNITED STATES PATENT OFFICE 2,496,064

CERTAIN IODINATED HYDROXYPHENYL CYCLOALKYL CARBOXYLIC ACIDS

Samuel Natelson and Benjamin Kramer, Brooklyn, N. Y., and Ralph Tekel, Chicago, Ill., assignors to The Jewish Hospital of Brooklyn Research Foundation, Inc., Brooklyn, N. Y., a corporation of New York No Drawing. Application February 9, 1949, Serial No. 75,484

6 Claims. (Cl. 260—520)

This invention relates to halogenated hydroxy phenyl derivatives of saturated carboxylic acids and the salts and esters thereof, and in particular is directed to compounds of that class wherein the saturated hydrocarbon portion of the molecule comprises an alicyclic structure.

We have found that these compounds, because of their opacity to X-rays and their property of concentrating in the gall bladder, are particularly valuable as contrast media in roentgenological examinations of the gall bladder. They may be administered orally or intravenously.

These compounds are especially advantageous for use as contrast media because:

1. They are stable compounds of definite chemical composition, the halogen being firmly attached to the benzene ring.

2. They contain not more than one benzenoid structure with a free phenolic group.

The importance of maintaining the phenolic group in free condition is that it renders the compound susceptible of ready absorption and concentration in the gall bladder, as well as subsequent easy elimination from the body.

These compounds have the general formula $$HO(C_6I_xH_{(4-x)}).Y.COOH$$

wherein:

Y is a divalent saturated hydrocarbon radical having from 4 to 17 carbon atoms, and comprising an alicyclic structure.

$x$ is selected from the integers in the series 1 and 2.

For the visualization of the gall bladder they may be used in the free acid form or in the form of their soluble salts prepared from organic or inorganic bases.

The hydroxy diiodo phenyl group and the carboxy group are essential structures in a compound used for visualization of the gall bladder. A portion of the molecule has to impart oil solubility so that the compound may resemble bile salts. We have found that the saturated hydrocarbon residue containing the alicyclic group serves admirably for this purpose.

In our investigation we have prepared the following compounds:

1-(acetic acid)-2(4-OH-3,5-diiodo phenyl)-cyclohexane having the formula

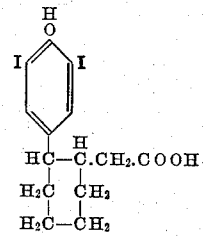

2(4 hydroxy-3,5-diiodo phenyl) cyclopentane carboxylic acid having the formula

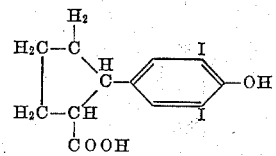

2(4 hydroxy-3,5-diiodo phenyl) decahydronaphthoic acid having the formula

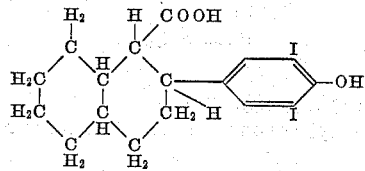

(4-OH-3,5-diiodo phenyl) dihydro hydnocarpic acid having the formula

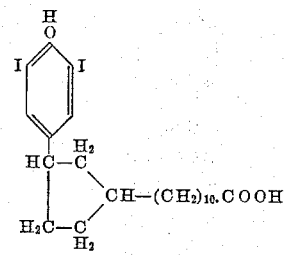

(4-OH-3,5-diiodo phenyl) dihydro chaulmoogric acid having the formula

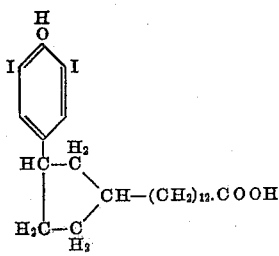

4-(4-OH-3,5-diiodo phenyl)-cyclohexyl carboxylic acid, having the formula

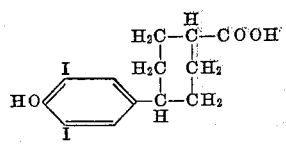

This compound has been reported in our preceding application, Serial No. 668,481, as having the formula 2-(4-OH-3,5-diiodo phenyl)-cyclohexyl carboxylic acid. On reexamination of the product prepared by the condensation of the ethyl ester of cyclohexene $\Delta^1$ carboxylic acid with anisole, by means of aluminum chloride, we have found that a rearrangement takes place in the molecule, 2-(4 hydroxyphenyl)-cyclohexyl acetic acid, as it is formed, the molecule changing into the 4-(4 hydroxyphenyl)-cyclohexyl carboxylic acid, which on iodination produces the 4-(4 OH-3,5-diiodo phenyl) cyclohexyl carboxylic acid.

2-(4 hydroxy-3,5-diiodo benzyl) cyclohexyl carboxylic acid, having the formula

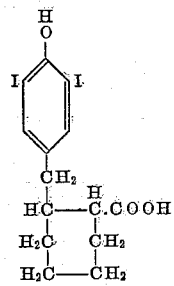

2-(4 hydroxy-3,5-diiodo benzyl)-4,5-dimethyl cyclohexyl carboxylic acid, having the formula

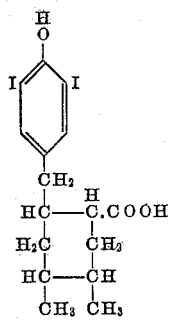

alpha methyl-2-(4 hydroxy-3,5-diiodo phenyl)-4 methyl cyclohexyl acetic acid, having the formula

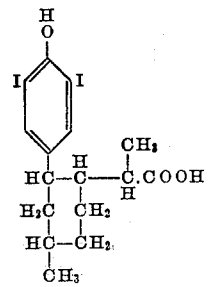

alpha ethyl-2-(4 hydroxy-3,5-diiodo phenyl)-cyclohexyl acetic acid, having the formula

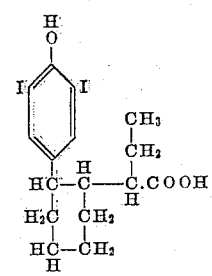

2-(4 hydroxy-3,5-diiodo phenyl)-cyclopentyl acetic acid, having the formula

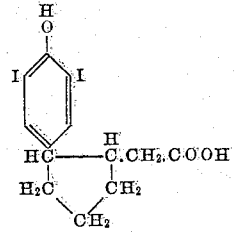

It is apparent that the changing of the relative positions of the hydroxy diiodo phenyl group and the carboxy group around the saturated hydrocarbon residue containing the alicyclic group does not alter the value of the compound as a gall bladder contrast agent. The efficacy of these compounds in visualizing the gall bladder resides in the fact that they all contain a hydroxy diiodo phenyl group and a carboxy group linked to a saturated hydrocarbon radical which may be an alicyclic group or which may contain an alicyclic group, the whole radical having from 4 to 17 carbon atoms. We have found as particularly suitable for use in the visualization of the gall bladder those compounds in which the hydrocarbon radical has from 5 to 10 carbon atoms, such structure possessing the property of oil solubility and having good absorption from the intestinal tract.

(4-OH-3,5-diiodo phenyl) dihydro hydnocarpic acid and (4-OH-3,5-diiodo phenyl) dihydro chaulmoogric acid are good contrast media for the visualization of the gall bladder, but because of their large molecular size are not absorbed as well as the lighter members of the series. Since portions of the heavier compounds may not be absorbed from the intestinal tract, they appear in that tract on the X-ray film and sometimes interfere with the interpretation of the film. In contrast with the compounds of large molecular size, we have found that the ones in which the saturated hydrocarbon radical contains from 5 to 10 carbon atoms are very well absorbed from the intestinal tract, and therefore are excellent agents for visualization of the gall bladder.

EXAMPLE 1

1 - carboxy methyl - 2 - (4 - hydroxy - 3,5 - diiodo phenyl) - cyclo hexane also known as 1-(acetic acid) - 2 - (4 hydroxy - 3,5 - diiodo phenyl) cyclohexane.

This acid has the formula

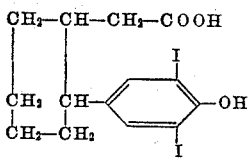

1.926 moles of anisole, dissolved in 200 cc. of aluminum chloride-dried petroleum ether, are added to 1.926 moles of anhydrous aluminum chloride, at a temperature maintained by an ice and salt bath, of 0°–5° C. Then 0.963 mole of the methyl ester of cyclohexene-Δ-1,2-acetic acid are slowly added through a dropping funnel, keeping the reaction temperature below 20° C. The mixture is then stirred for 30 minutes, brought to room temperature and the stirring continued until the petroleum ether layer no longer absorbs any bromine, indicating that the —C:C— linkage has been completely saturated.

The addition product thus formed is decomposed by pouring it into 2 liters of water containing 250 grams of ice mixed with 100 cc. of concentrated hydrochloric acid. Then the aqueous layer is separated from the oily layer which is washed with water until it is free of acid, and dried overnight with anhydrous sodium sulphate. The sodium sulphate is removed by filtration and the petroleum ether removed from the filtrate by heating on a steam bath.

The unreacted anisole is removed by vacuum or steam distillation, and the ester condensation product, the methoxy phenyl cyclohexane acetic acid methyl ester is distilled at a pressure of 0.3 mm.

DEMETHYLATION

Saponification of the ester

Into a solution of 0.55 mole of potassium hydroxide in 500 cc. of ethyl alcohol there are added 0.5 mole of the ester, and the mixture is refluxed for one hour. Then the alcohol is removed by distillation, under vacuum, on a hot water bath. To the residue, 2 liters of water are added. Hydrochloric acid is slowly added until acidification is completed. The acid is extracted from the aqueous layer by means of several 150 cc. portions of ethyl ether. The ethereal extract is dried with anhydrous sodium sulphate, which is subsequently removed by filtration. The ether is removed by evaporation on a steam bath, and the methoxy phenyl cyclohexane acetic acid is then demethylated without further purification, as described below.

Demethylation 1.5 moles of the acid are added to 3 moles of 48% hydrobromic acid dissolved in 2 liters of glacial acetic acid, and the mixture is refluxed while a stream of nitrogen or carbon dioxide flows continuously over the surface of the reaction mixture until demethylation is completed (about 8 hours). The mixture is added to water, acidified and filtered. The residue is dissolved in ethyl ether, washed with water and dried over sodium sulphate. Then the ether is evaporated off, and the hydroxy phenyl cyclohexane acetic acid is distilled at a pressure of 0.1 mm.

Iodination 1 mole of the hydroxy phenyl cyclohexane acetic acid is dissolved in 10% sodium hydroxide solution containing 4 moles of sodium hydroxide. To the solution, cooled to 0.0°–5° C. with an ice-salt bath, there is slowly added 4 moles of iodine contained in a 50% solution of potassium iodide. The mixture is stirred for 30 minutes, and the excess iodine is destroyed with a saturated solution of sodium bisulphite. The mixture is then poured into 4 moles of concentrated hydrochloric acid, to which has been added 50 cc. of carbon tetrachloride. The addition is slow with vigorous stirring. The crystalline precipitate is filtered, redissolved in a solution of sodium hydroxide, charcoal is added, stirred and filtered. Then the solution is added to 2 moles of concentrated hydrochloric acid, to which 50 cc. of carbon tetrachloride is added. The white crystalline, 1 - (acetic acid) - 2 - (4 hydroxy - 3,5 - diiodo phenyl) cyclohexane is recrystallized from carbon tetrachloride.

EXAMPLE 2

Xi-(4 hydroxy - 3,5 - diiodo phenyl) - dihydrochaulmoogric acid.

This acid has the formula

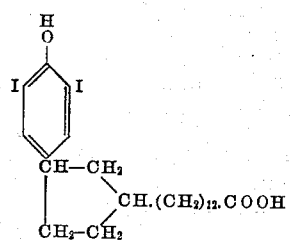

1.926 moles of anisole are dissolved in 0.963 mole of the methyl ester of chaulmoogric acid. The mixture is condensed by means of aluminum chloride as described in Example 1. The methoxy phenyl dihydrochaulmoogric acid methyl ester thus obtained is saponified and demethylated as described in Example 1. The product thus obtained, Xi-(4 hydroxy phenyl)-dihydrochaulmoogric acid is iodinated as in Example 1.

EXAMPLE 3

Mu-(4 hydroxy-3,5-diiodo phenyl)-dihydrohydnocarpic acid.

This acid has the formula

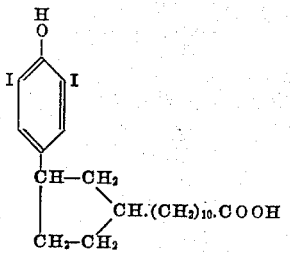

1.926 moles of anisole are dissolved in 0.963 mole of the methyl ester of hydnocarpic acid. The mixture is condensed by means of aluminum chloride as described in Example 1. The methoxy phenyl dihydrohydnocarpic acid methyl ester thus obtained is saponified and demethylated as described in Example 1. The product thus obtained, Mu-(4 hydroxy phenyl)-dihydrohydnocarpic acid is iodinated as described in Example 1.

EXAMPLE 4

1-(1-carboxy ethyl)-2-(4-hydroxy-3,5-diiodophenyl)4-methyl-cyclohexane also known as alpha methyl, 2(4 hydroxy-3,5-diiodo phenyl)-4 methyl cyclo hexyl acetic acid having the formula

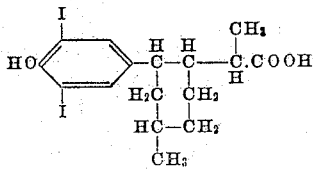

was prepared in accordance with the method of Example 1 by using, as initial starting materials, the ethyl ester of alpha methyl-(4 methyl cyclohexene-Δ-1,2) acetic acid and anisole. The ethyl ester is prepared as follows:

Dissolve 1 mole of 4 methyl cyclo hexanone in 1 liter of a mixture of equal parts of benzene and toluene. To this solution add 1 mole of alpha bromo propionic acid ethyl ester. Then add an excess of 1 mole of pure zinc dust and reflux the mixture for about 3 hours. 2 moles of hydrochloric acid (10% solution) is now added. The aqueous layer is discarded and the solvent layer containing the hydroxy ester is dried over sodium sulphate. Dry hydrogen chloride is bubbled into the dried solvent layer for 4 hours to dehydrate the hydroxy ester. The hydrochloric acid is washed out therefrom with water and the residue is fractionated, recovering, first, the solvent and then, the alpha (4 methyl cyclohexene-Δ-1,2-)-propionic acid ethyl ester.

This product is then condensed with anisole, using aluminum chloride as in Example 1. The mixture is saponified as in Example 1 to yield alpha methyl, 2-(4 hydroxy phenyl) 4 methyl cyclo hexyl acetic acid which is iodinated as described in Example 1.

EXAMPLE 5

Alpha ethyl, 2(4 hydroxy-3,5-diiodo phenyl) cyclohexane acetic acid having the formula

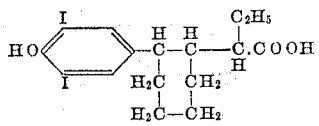

was prepared in accordance with the method described in Example 1 by using alpha ethyl cyclohexene-Δ-1,2-acetic acid ethyl ester and anisole as the initial starting materials, followed by saponification and iodination.

EXAMPLE 6

2-(4 hydroxy-3,5-diiodo phenyl phenyl)-cyclo pentyl acetic acid having the formula

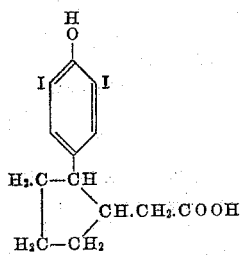

was prepared in accordance with the method described in Example 1 by using cyclo pentene-Δ-1,2-acetic acid methyl ester and anisole as the initial starting materials, followed by saponification and iodination.

EXAMPLE 7

2-(4 hydroxy-3,5-diiodo benzyl) cyclo hexyl carboxylic acid having the formula

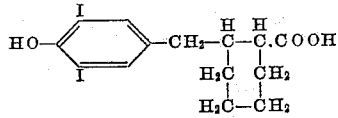

is prepared as follows:

1 mole of hexahydrophthalic anydride is dissolved in 400 cc. of acetylene tetrachloride (dried and redistilled). To this solution there are added 1.2 moles of anisole, and the resulting solution cooled by means of an ice-salt bath to 0° C. There are then added 2.2 moles of anhydrous aluminum chloride over a period of one hour, care being taken to keep the temperature from exceeding 40° C. The resultant mass is then heated on a steam bath for one-half hour. The condensation product is then cooled with a water bath. To this mass there are added 2 liters of a cold 10% hydrochloric acid solution. The water layer is removed after which the anisole and acetylene tetrachloride are removed by steam distillation.

The anisoyl hexahydro benzoic acid is separated from the aqueous layer, washed with hot water, and the residue digested with 150 grams of sodium carbonate dissolved in 1 liter of water. After filtering, the filtrate is cooled, extracted with ether and then acidified with 250 cc. of concentrated hydrochloric acid.

Reduction of the keto acid

Shake 100 grams of mossy zinc, 10 grams mercuric chloride, 5 cc. concentrated hydrochloric acid and 150 cc. water. Decant the supernatant fluid and to the residue add 77 cc. of water, 175 cc. of concentrated hydrochloric acid, 100 cc. of ethyl alcohol and 100 cc. of toluene. To the foregoing mixture there are added 0.085 mole of the above keto acid. It is then refluxed for 24 hours during which time three 50 cc. portions of concentrated hydrochloric acid are added every six hours. The material is then cooled to room temperature, the toluene layer separated, and the water layer extracted with ether. The extract and the toluene layer are combined and dried over calcium chloride, after which the solvents are removed by distillation. The anisyl hexahydro benzoic acid is purified by vacuum distillation at pressure of not more than 1 mm.

Demethylation of the anisyl hexahydro benzoic acid to 4 hydroxy benzyl hexahydro benzoic acid and the iodination are carried in accordance with the respective procedures for such steps as described in Example 1, yielding 2-(4-hydroxy-3,5-diiodo benzyl) hexahydro benzoic acid.

EXAMPLE 8

2-(4 hydroxy-3,5-diiodo benzyl)-4,5-dimethyl cyclo hexyl carboxylic acid having the formula

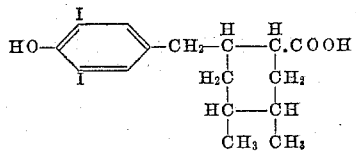

is prepared in accordance with the method described in Example 7 by using 4,5-dimethyl hexahydro phthalic anhydride and anisole as the initial starting materials. The condensation of the reactants and the subsequent reduction follow the course described in Example 7 to yield 2-(4 methoxy benzyl)-4,5-dimethyl cyclo hexyl carboxylic acid which is then dimethylated as in Example 1 and iodinated as described in Example 1.

EXAMPLE 9

2(4 hydroxy-3,5-diiodo phenyl) cyclopentane carboxylic acid having the formula

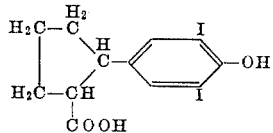

was prepared, in accordance with the method of Example 1, by using, as initial starting materials, the methyl ester of cyclopentene carboxylic acid and anisole, followed by saponification and iodination.

EXAMPLE 10

2(4 hydroxy-3,5-diiodo phenyl) decahydronapthoic acid having the formula

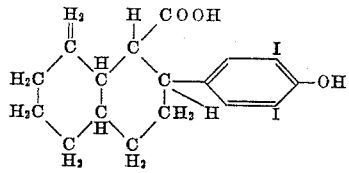

was prepared, in accordance with the method of Example 1, by using, as initial starting materials, the methyl ester of -Δ-1,2 octahydro,1,-naphthoic acid and anisole, followed by saponification and iodination.

This application is a continuation in part of our pending application Serial No. 668,481, filed May 9, 1946, which application was a continuation in part of our application Serial No. 648,568, filed February 18, 1946, now Patent No. 2,400,433, the latter being a continuation in part of our application, Serial No. 516,970, filed January 4, 1944, now abandoned.

We claim:

1. Compounds having the general formula

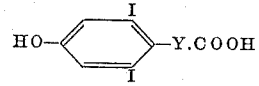

wherein Y is a divalent saturated hydrocarbon group of from 5 to 10 carbon atoms containing an alicyclic structure embodying the radical of a member selected from the class consisting of cyclo pentane and cyclo hexane constituting a bridge between the carboxyl radical and the benzene nucleus and wherein the alicyclic nucleus forms a part of said bridge.

2. 2(4 hydroxy-3,5-diiodo benzyl) cyclo hexyl carboxylic acid.

3. 1-(carboxymethyl)-2(4 hydroxy-3,5-diiodo phenyl) cyclo hexane.

4. 2(4 hydroxy-3,5-diiodo phenyl) cyclo pentyl carboxylic acid.

5. 1-(1 - carboxyethyl)-2-(4 - hydroxy - 3,5-diiodophenyl)-4-methyl-cyclohexane.

6. 2-(4 hydroxy-3,5-diiodo benzyl) - 4,5-dimethyl cyclohexyl carboxylic acid.

SAMUEL NATELSON.
BENJAMIN KRAMER.
RALPH TEKEL.

REFERENCES CITED

The following references are of record in the file of this patent:

UNITED STATES PATENTS

| Number | Name | Date |
|---|---|---|
| 2,400,433 | Natelson et al. | May 14, 1946 |